United States Patent

Ross, II

Patent Number: 5,127,437
Date of Patent: Jul. 7, 1992

[54] VALVE

[75] Inventor: Paul F. Ross, II, St. Louis, Mo.

[73] Assignee: Control Devices, Incorporated, St. Louis, Mo.

[21] Appl. No.: 641,436

[22] Filed: Jan. 15, 1991

Related U.S. Application Data

[63] Continuation of Ser. No. 483,935, Feb. 23, 1990, Pat. No. 4,986,297.

[51] Int. Cl.[5] ............ F16K 11/10; F16K 31/50; F16K 41/00
[52] U.S. Cl. .............. 137/614.18; 137/543.13; 137/614.19; 137/614.2; 137/881; 137/883; 137/886; 251/214; 251/215; 251/324; 251/900
[58] Field of Search ............ 137/315, 542, 543.13, 137/881, 883, 885, 886, 614.18, 614.19, 614.2; 251/214, 215, 218, 324, 900

[56] References Cited

U.S. PATENT DOCUMENTS

| | | | |
|---|---|---|---|
| 2,358,228 | 9/1944 | Hoof | 251/900 |
| 2,669,415 | 2/1954 | Gilroy | 251/215 |
| 3,200,839 | 8/1965 | Gallagher | 251/332 |
| 3,327,992 | 6/1967 | Billeter et al. | 251/215 |
| 3,731,905 | 5/1973 | Piet | 251/900 |
| 4,120,319 | 10/1978 | Krechell et al. | 137/881 |
| 4,187,884 | 2/1980 | Loveless | 251/900 |
| 4,277,031 | 7/1981 | Moumanerx | 251/900 |
| 4,417,601 | 11/1983 | Bennett | 251/215 |
| 4,615,485 | 10/1986 | Larson et al. | 251/215 |
| 4,705,076 | 11/1987 | Krechel et al. | 137/881 |
| 4,768,550 | 9/1988 | Krechel et al. | 137/881 |
| 4,834,131 | 8/1989 | Austin | 251/900 |
| 4,844,414 | 7/1989 | Sable et al. | 251/900 |

*Primary Examiner*—George L. Walton
*Attorney, Agent, or Firm*—Senniger, Powers, Leavitt & Roedel

[57] ABSTRACT

A valve for controlling flow of air from a source of air under pressure such as a compressed air tank comprising an elongate body with first and second ends and first and second sides lying opposite one another. A transverse opening, extending between the first and second sides of the body adjacent its first end, has five coaxial sections of circular cross section having various diameters. The valve further includes a valve stem having a head with a pair of annular grooves in it, each holding an O-ring. The O-ring closest to the inner end of the head is engageable with a valve seat provided in of the transverse opening on inward movement of the stem to close the valve. A knob is attached to the valve stem to facilitate moving the stem. The valve stem with the O-rings in the grooves but without the knob is capable of assembly by inserting the stem into the opening from one side of the body.

1 Claim, 2 Drawing Sheets

VALVE

This is a continuation, of application Ser. No. 07/483,935 as filed Feb. 23, 1990, U.S. Pat. No. 4,986,297.

BACKGROUND OF THE INVENTION

This invention relates generally to a valve, and more particularly to a valve for controlling flow of air from a source of compressed air.

The valve of the present invention is in the same general field as the manifold assemblies for compressed air tanks shown in U.S. Pat. Nos. 4,120,319, 4,705,076 and 4,768,550, and involves improvements thereover. All of these patents are incorporated herein by reference.

SUMMARY OF THE INVENTION

Among the several objects of this invention may be noted the provision of a valve for controlling flow of compressed air which has few component parts; the provision of such a valve of simplified construction which is easily assembled from its component parts and the provision of such a valve which is inexpensive to manufacture, easy to install and reliable in operation.

In general, a valve of the present invention for controlling flow of air from a source of air under pressure such as a compressed air tank comprises an elongate valve body having first and second ends and first and second sides lying opposite one another. The valve body has a transverse opening adjacent its first end extending between the first and second sides of the body. The transverse opening includes a first section of circular cross section extending inwardly from the first side. A second section of the transverse opening, coaxial with the first section and located at the inner end of the first section, has a circular cross section smaller than the diameter of the first section. A third section of the transverse opening, which is adjacent the second section and coaxial with the first and second sections, has a circular cross section of larger diameter than the second section. A fourth section, which is adjacent the third section and coaxial with the first, second and third sections, has a circular cross section of smaller diameter than the second section. A fifth section of the transverse opening has a circular cross section of smaller diameter than the fourth section and is coaxial with the first, second, third and fourth sections. The body has a longitudinal passage extending from its second end to the third section of the transverse opening. The second section of the transverse opening is defined by a radially inwardly extending annular formation integral with the body located between the first and third sections of the transverse opening. The annular formation has a first annular surface facing toward the first section and a second annular surface facing toward the third section with the annular surfaces converging radially inwardly toward one another. The second surface continues into the third section and forms an annular valve seat all around the inside of the second section and the adjacent side of the third section. A valve stem, having a head of circular cross section of slightly smaller diameter than the diameter of the fourth section of the transverse opening and thus of smaller diameter than the second section, extends from the fourth section into the third section of the transverse opening. The valve stem further includes an extension which extends from the head through the fifth section of the transverse opening and is in threaded interengagement with the fifth section. A knob on the extension outside the body facilitates turning the stem to move it axially inwardly and outwardly. The valve stem head has a first annular groove at its end in the third section. A first resiliently compressible O-ring is located in the first groove and has such a diameter as, when radially uncompressed, to project radially outwardly beyond the head for engagement with the valve seat to close off the first section of the transverse opening from the third section and the passage, on inward movement of the stem. The head has a second annular groove adjacent its other end, in which is located a second resiliently compressible O-ring which, when uncompressed, is of larger diameter than the fourth section. The second O-ring is radially compressed in the fourth section to seal off the fifth section from the passage and the third section. The stem with the O-rings in the grooves but without the knob is capable of assembly with the body by inserting it through the transverse opening from the first side of the body, the O-rings squeezing through the second section of the transverse opening.

This invention is also directed to the process of making the valve. In the process, the valve body and valve stem having been provided, the transverse opening is formed in the valve body as by boring. The valve head extension is inserted from the first side of the valve body into the transverse opening with the second O-ring passing from said first section of said transverse opening through said second section. The second O-ring resiliently compresses upon engagement with the first annular surface of the second section for squeezing the second O-ring through the second section. The valve head extension is then threaded in the fifth section, with the second O-ring passing from said third section into said fourth section and being compressed said fourth section. The first O-ring passes from the first section through the second section with the first O-ring resiliently compressing upon engagement with the first annular surface of the second section for squeezing the first O-ring through the second section. Finally, the knob is affixed to the valve head extension. The first O-ring is engageable with the valve seat upon axially inward movement of the valve stem by turning the knob for closing off the first section from the third section and the longitudinal passage.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
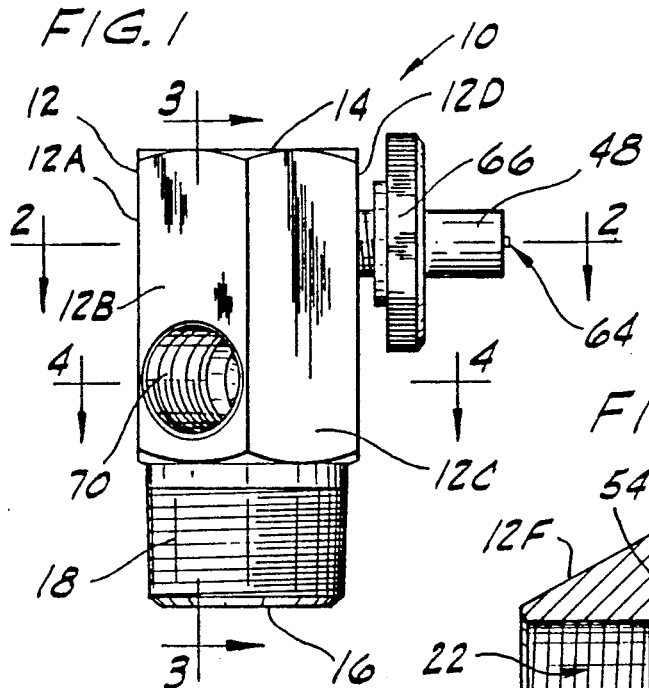
FIG. 1 is a side elevation of a valve of this invention.

Referring now to the drawings, a valve of this invention, generally indicated at 10, is shown to comprise an elongate valve body 12 of hexagonal cross section, its six sides being designated 12A-12F, and having first and second ends designated 14 and 16 respectively. An end portion 18 of the valve body 12, adjacent the second end of the body 12, has a circular cross section with external threads 20 for attachment of the valve 10 to a source of air under pressure such as a compressed air tank (not shown).

Figure 3:
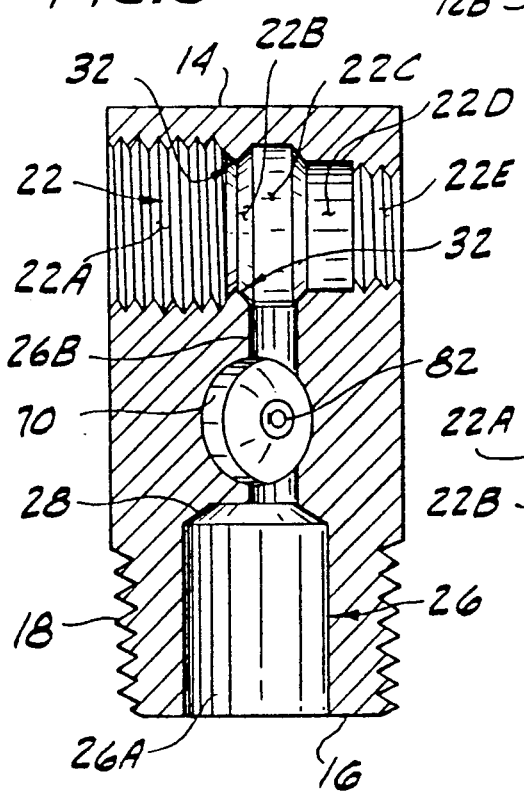
FIG. 3 is a vertical section on line 3—3 of FIG. 1.
Figure 3A:
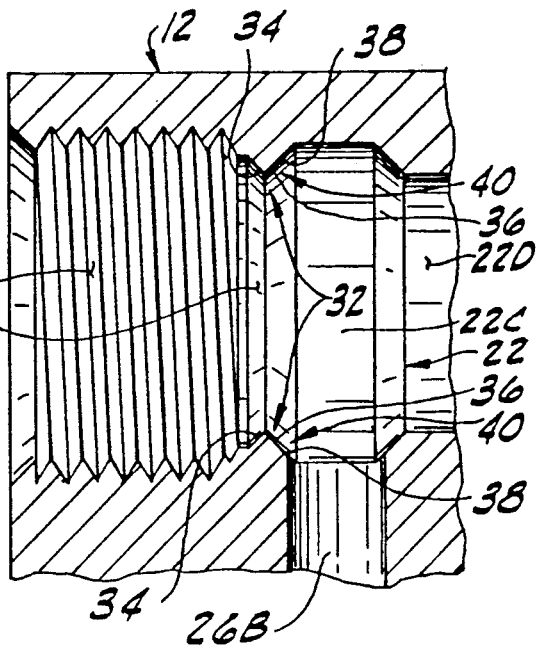
FIG. 3A is an enlarged fragment of FIG. 3 showing the converging surfaces of the second section of the transverse opening.

The body 12 has a transverse opening, generally indicated at 22, extending between a first side 12A and a second side 12D adjacent the first end 14 of the body 12. As best seen in FIG. 3, the transverse opening 22 includes five coaxial sections of circular cross section, designated 22A-22E, respectively. The first section 22A extends inwardly from the first side 12A of the body 12 and is threaded for coupling of the valve 10 with a conduit (not shown) for delivery of the compressed air from the valve. The second section 22B extends inwardly from the inner end of the first section and has a smaller diameter than the first section 22A. The third section 22C, which is adjacent the second section 22B, has a larger diameter than the second section, and the fourth section 22D, adjacent the third section, is of smaller diameter than the second section. The fifth section 22E, which is adjacent the fourth section 22D, has a smaller diameter than the fourth section and is threaded. The fifth section 22E terminates at the second side 12D of the body 12.

A longitudinal passage 26 extends from the second end 16 of the body 12 to the third section 22C of the transverse opening 22. As shown in FIG. 3, the passage 26 includes a first portion 26A of circular cross section which is tapered radially inwardly at its axially inner end and terminates at a wall 28 of the body 12. A second portion 26B of the passage has circular cross section of a diameter less than the first portion 26A and extends inwardly from the wall 28 at the inner end of the first portion 26A. The second portion of the passage 26B communicates with the first portion 26A and the third section 22C of the transverse opening 22 in the body 12.

The second section 22B of the transverse opening 22 is defined by a radially inwardly extending annular formation, indicated generally at 32, integral with the body 12 between the first and third sections 22A, 22B of the transverse opening. The annular formation 32 has a first annular surface 34 facing toward the first section 22A and a second annular surface 36 facing toward the third section 22C. The annular surfaces 34, 36 converge radially inwardly toward one another. A portion 38 of the second annular surface continues into section 22C. The portion 38 and the second annular surface 36 form an annular valve seat, indicated generally at 40, all around the inside of the second section 22B and the adjacent side of the third section 22C.

Figure 2:
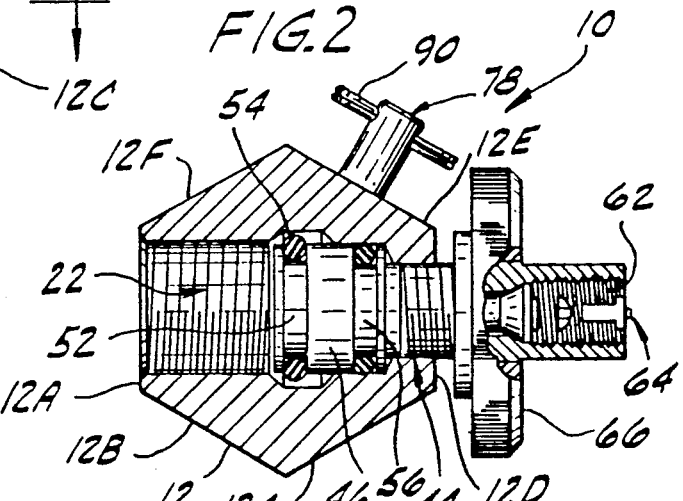
FIG. 2 is a transverse section on line 2—2 of FIG. 1 with part of the valve stem broken away to show detail.

Referring now to FIG. 2, a valve stem, indicated generally at 44, has a head 46 of circular cross section of slightly smaller diameter than the fourth section 22D and thus of smaller diameter than the second section 22B of the transverse opening 22. As disposed in the valve body 12, the valve stem 44 extends from the fourth section 22D into the third section 22C with an extension 48 of the valve stem extending from the head 46 through the fifth section 22E and out the second side 12D of the body. The extension 48 is threaded at its inner end (with respect to the second side of the valve body 12) and engages threads in the fifth section 22E of the transverse opening. The head 46 of the valve stem has a first annular groove 52 at its inner end located in the third section 22C. A first resiliently compressible O-ring 54 of elastomeric material is held in the groove 52 and has a diameter which, when the O-ring is radially uncompressed, projects radially outwardly beyond the head 46 for engagement with the valve seat 40 to close off the first section 22A of the transverse opening from the third section 22C and the longitudinal passage 26 in the body 12 on inward movement of the stem 44 from its position shown in FIG. 2. A second annular groove 56 adjacent the axially outer end of the head 46 holds a second resiliently compressible O-ring 58 which, when the O-ring is uncompressed, is of larger diameter than the fourth section 22D. As shown in FIG. 2, the second O-ring 58 is radially compressed in the fourth section 22D to seal off the fifth section 22E from the passage 26 and the third section 22C. The grooves 52, 56 are sized to allow the first and second O-rings 54, 58 to deform into their respective grooves as they are compressed to facilitate assembly of the valve stem 44 in the transverse opening 22, as will be described more fully below.

The valve stem 44 has a stem passage 62 and filler check valve, indicated generally at 64, in the passage for filling the tank with air from a supply of compressed air. The stem passage and check valve are substantially the same as described in U.S. Pat. Nos. 4,705,076 and 4,768,550.

A knob 66 mounted on the extension 48 of the valve stem outside the body 12 adjacent its second side 12D facilitates turning the stem 44 to move it axially inwardly and outwardly to open and close the valve. The knob 66 is engageable with the second side 12D of the body as the valve stem 44 is moved axially inward to prevent the first O-ring 54 from being forced past the annular valve seat 40 and into the first section 22A of the transverse opening. The knob 66 is axially positioned on the valve extension 48 so that when the valve is moved all the way in, the first O-ring 54 engages the valve seat 40 with sufficient force to seal the first section 22A from the passage 26 and the third section 22C.

As will be described more fully below, the stem 44 with the O-rings 54, 58 in the grooves 52, 56 but without the knob 66 is capable of assembly with the body 12 by inserting it through the transverse opening 22 from the first side 12A of the body. The O-rings 54, 58 are squeezed through the second section 22B for assembly of the valve 10. The construction of the valve permitting this method of assembly of the valve stem 44 with the valve body 12 allows the valve of the present invention to be constructed of fewer parts than the manifold assemblies disclosed in U.S. Pat. Nos. 4,705,076 and 4,768,550. Thus, the valve does not require an outlet member threaded into the transverse opening after insertion of the valve stem therein to retain the valve stem in the transverse opening and provide a valve seat therefor.

Figure 4:
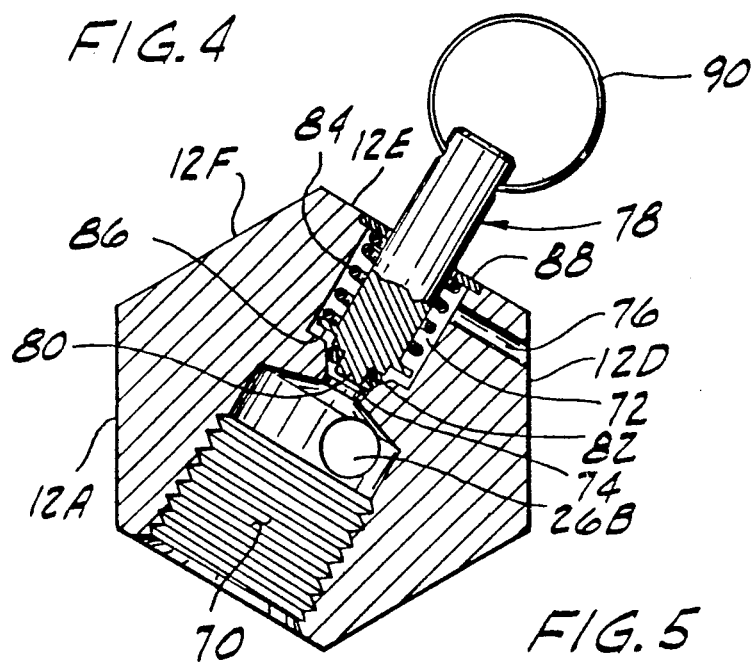
FIG. 4 is a partial transverse section with part of the safety valve broken away to show its construction.

The valve 10 of the present invention has pressure relief and pressure gauge attachment features, described in brief below, substantially corresponding to those features described in U.S. Pat. Nos. 4,768,550 and 4,705,076. The pressure gauge attachment feature comprises a partially threaded first bore 70 extending inwardly from a third side 12B of the six sides of the body 12 and communicating with the second portion 26B of the longitudinal passage 26. The first bore 70 receives a gauge (not shown) for measuring the pressure of air in the tank to which the valve body 12 is attached. As best seen in FIG. 4, the pressure relief feature comprises an unthreaded second bore 72 extending inwardly from a fourth side 12E of the body opposite the third side 12B and communicating with the first bore 70 and the second portion 26B of the passage. The second bore 72 is counterbored to form a valve seat 74 adjacent the inner end of the second bore 72. A third bore 76 extends inwardly from the second side 12D of the body to the second bore 72 to form a transverse port. A pressure relief safety valve, indicated generally at 78 having a valve head 80 at its inner end is incorporated within the second bore 72. An O-ring 82 at the end of the valve head 80 is engageable with the valve seat 74 for closing the second and third bores 72, 76 from the first bore 70 and the longitudinal passage 26. A compression spring 84 in the second bore 72 engages a flange 86 of the valve head 80 at its inner end and a closure 88 at its outer end for biasing the O-ring 82 against the valve seat 74 so that the second bore 72 is closed from the passage 26. Air is vented from the tank through the third bore 76 (transverse port) when the force of air on the closure 88 exceeds the biasing force of the spring 84 or on manually pulling the pressure relief valve 78 by means of a ring 90 at the outer end of the valve.

The method of this invention for manufacturing the valve 10 of the present invention, and particularly relating to the assembly of the valve stem 44 in the valve body 12, comprises the steps of providing the valve body and valve stem, and forming as by boring the transverse opening 22 extending between the first and second sides 12A, 12D of the valve body. The forming step includes drilling a bore through the valve body 12 with a stepped drill bit having multiple diameters corresponding to the diameters of the first section 22A, second section 22B, fourth section 22D and fifth section 22E of the transverse opening, to rough out the transverse opening. The stepped drill bit forms the first section 22A, the first annular surface 34 of the second section 22B, the fourth section 22D and the fifth section 22E. Whether a stepped drill bit is used to form the first, fourth and fifth sections or multiple drill bits are used to form the sections is not critical to this method of manufacture. Thereafter, a stepped tapping tool having one diameter corresponding to that of the first section 22A and another diameter corresponding to the diameter of the fifth section 22E is used to tap the first and fifth sections. A tool having a retractable cutting surface is inserted into the transverse opening 22 with its cutting surface axially disposed generally beyond the first annular surface 34 of the second section 22B but short of the fifth section 22E. The retractable cutting surface is extended in the transverse opening 22 to form the third section 22C and the second annular surface 36 of the second section 22B. It is to be understood that use of a stepped tool or separate tools to tap the first and fifth sections, and the order in which they are tapped are not critical to the invention.

Figure 5:
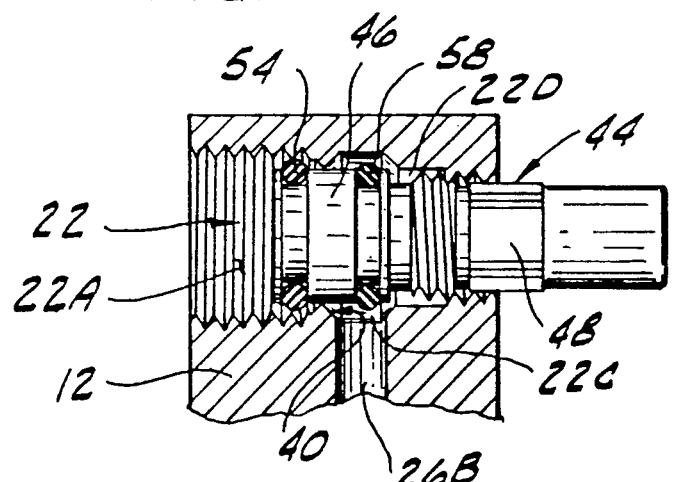
FIG. 5 and FIG. 6 are fragmentary sections of the valve showing the mode of assembly of the valve stem with the valve body.
Figure 6:
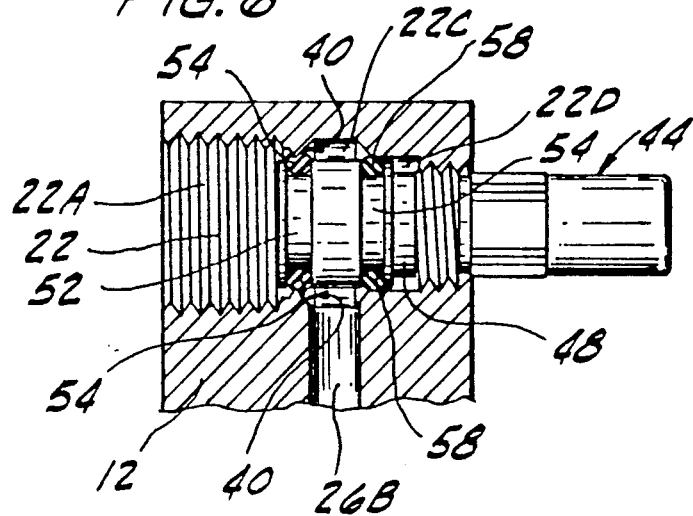

After providing the valve body 12 and valve stem 44, the valve 10 may be assembled by holding the valve body in place and inserting the valve stem extension 48 from the first side 12A of the valve body into the first section 22A of the transverse opening. The insertion step may be done by frictionally engaging the end of the valve head 46 opposite the valve head extension 48 with a tool which rotates and applies a force on the valve stem 44 pushing it into the transverse opening. Other ways of inserting the valve stem into the transverse opening, such as by hand, are also included within the scope of this invention. As the valve stem 44 is pushed further into the transverse opening 22, the second O-ring 58 of the valve head 46 engages the first annular surface 34 of the second section 22B. Compression of the second O-ring 58 radially inwardly is facilitated by the radially inwardly converging first annular surface 34 which acts to squeeze the second O-ring as it passes through the second section 22B. Further, the size of the groove 56 in which the second O-ring is held is large enough to allow deformation of the O-ring into the groove as it is squeezed in the second section 22B. The valve stem 44 may be rotated simultaneously as it is inserted into the transverse opening 22 so that the threaded portion of the valve head extension 48 threads into the fifth section 22E of the transverse opening, as is illustrated in FIG. 5. Thereafter, the rotation of the valve stem 44 and its threaded interengagement with the valve body 12 in the fifth section 22E results in further movement of the valve stem into the valve body. As shown in FIG. 6, the second O-ring 58 is squeezed into the fourth section 22D of the transverse opening upon further inward movement of the valve stem 44 and the first O-ring 54 is squeezed through the second section 22B into the third section 22C. Compression of the first O-ring 54 radially inwardly, as with the second O-ring 58, is facilitated by the radially inwardly converging first annular surface 34 which acts to squeeze the first O-ring as it passes through the second section 22B. Further, the size of the groove 52 in which the first O-ring 54 is held is large enough to allow deformation of the first O-ring into the groove as it is squeezed in the second section 22B. Once fully inserted into the transverse opening, the assembly of valve stem 44 in valve body 12 is complete. No outlet member is required, as shown in U.S. Pat. Nos. 4,705,076 and 4,768,550, to retain the valve stem in the valve body 12 or to provide a valve seat for the valve head. The knob 66 is then affixed to the valve head extension 48 projecting out of the transverse opening on the second side of the valve body 12.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A valve for controlling flow of air from a source of air under pressure such as a compressed air tank comprising:
   an elongate valve body having first and second ends and first and second sides lying opposite one another,
   one end being formed for connection to said source of air under pressure,
   said body having a chamber therein adjacent its other end,
   a longitudinal passage in the body from its said one end to said chamber,
   an outlet passage extending from said chamber to one of said sides of the body, said outlet passage being internally threaded for threading therein of a conduit for delivery of compressed air from the valve, a radially inwardly extending annular formation at the inner end of the outlet passage integral with the body having a central circular opening therein, said annular formation forming an annular valve seat formed integrally with the body at the inner end of said outlet passage at said chamber, a cylindrical opening extending in line with said outlet passage from said chamber toward the other of said sides of the body, a threaded opening in line with said cylindrical opening extending from the outer end of said cylindrical opening to the other of said sides of the body, a valve stem threaded in said threaded opening, the valve stem having a maximum diameter which is less than the diameter of the central circular opening of said annular formation, but larger than said threaded opening.

said valve stem having a head at its inner end slidable in said cylindrical opening and extending into said chamber.

said head having sealing means thereon in sealing engagement in said cylindrical opening and valve means at its end in the chamber engageable with the valve seat by turning the stem to move the head in the direction toward the seat for sealing off the outlet passage from the chamber, the sealing means on the head remaining in sealing engagement in said cylindrical opening to seal off the threaded opening from the chamber, said valve stem having a passage therein and a check valve in this passage for filling the tank with air from a supply of compressed air via the valve stem, the chamber and said longitudinal passage in the body when the valve means is closed against the valve seat.

* * * * *